United States Patent
Libin et al.

(10) Patent No.: US 11,974,580 B2
(45) Date of Patent: May 7, 2024

(54) TURKEY CROP SKIN CUTTER

(71) Applicant: BLEXLEY HOLDINGS LLC, Columbus, OH (US)

(72) Inventors: Alexander Libin, Columbus, OH (US); Evan Pulsinelli, Millersport, OH (US); Michael Grunden, Columbus, OH (US)

(73) Assignee: BLEXLEY HOLDINGS LLC, Columbus, OH (US)

( * ) Notice: Subject to any disclaimer, the term of this patent is extended or adjusted under 35 U.S.C. 154(b) by 143 days.

(21) Appl. No.: 17/853,477

(22) Filed: Jun. 29, 2022

(65) Prior Publication Data
US 2023/0000093 A1 Jan. 5, 2023

Related U.S. Application Data

(60) Provisional application No. 63/314,038, filed on Feb. 25, 2022, provisional application No. 63/216,904, filed on Jun. 30, 2021.

(51) Int. Cl.
*A22C 21/00* (2006.01)

(52) U.S. Cl.
CPC ...... *A22C 21/0092* (2013.01); *A22C 21/0053* (2013.01)

(58) Field of Classification Search
CPC .................. A22C 21/0092; A22C 21/0053
USPC .............................................. 452/116
See application file for complete search history.

(56) References Cited

U.S. PATENT DOCUMENTS

| | | | | |
|---|---|---|---|---|
| 4,097,960 A | * | 7/1978 | Graham | A22C 21/0023 452/168 |
| 4,392,273 A | * | 7/1983 | De Long | A22C 21/0015 452/63 |

* cited by examiner

*Primary Examiner* — Richard T Price, Jr.
(74) *Attorney, Agent, or Firm* — SQUIRE PATTON BOGGS (US) LLP (57) ABSTRACT

Methods and apparatuses for crop cover skin removal are proposed. For example, a method can include receiving a bird in a station. The method can also include grasping crop cover skin of the bird by a pair of peeler rollers. The method can further include tensioning the crop cover skin by the pair of peeler rollers. The method can additionally include slicing the crop cover skin while the crop cover skin is being tensioned.

20 Claims, 6 Drawing Sheets

TURKEY CROP SKIN CUTTER

This application is related to and claims the benefit and priority of U.S. Provisional Patent Application No. 63/314,038, filed Feb. 25, 2022, and U.S. Provisional Patent Application No. 63/216,904, filed Jun. 30, 2021, each of which is hereby incorporated herein by reference in its entirety.

FIELD

Certain embodiments of the present invention relate to an apparatus and a method of removing the skin that covers the crop of a turkey. This removal can be performed during the evisceration of the turkey.

BACKGROUND

Removal of the skin that covers the crop of a turkey can be performed using one or more humans with straight edged knives and protective gear in the current operations of the turkey producers. Human beings tire. Tired people who are wielding knives may possibly injure themselves or their co-workers. Additionally, tired people may cut less accurately, which may damage the turkey breast meat near the skin that covers the crop, thereby reducing the value of the turkey.

SUMMARY

An embodiment of the present disclosure may be directed to an apparatus. The apparatus can include a first conveyor configured to convey a neck of a bird in a first direction. The apparatus can also include a second conveyer configured to convey crop cover skin of the bird in the first direction. The apparatus can further include a cutter configured to configured to cut the crop cover skin from the bird while the bird is conveyed in the first direction.

An embodiment of the present disclosure may be directed to a method. The method can include receiving a bird in a station. The method can also include grasping crop cover skin of the bird by a pair of peeler rollers. The method can further include tensioning the crop cover skin by the pair of peeler rollers. The method can additionally include slicing the crop cover skin while the crop cover skin is being tensioned.

An embodiment of the present disclosure may be directed to an apparatus. The apparatus can include means for means for conveying a neck of a bird in a first direction. The apparatus can also include means for conveying crop cover skin of the bird in the first direction. The apparatus can further include means for cutting the crop cover skin from the bird while the bird is conveyed in the first direction.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, and apparatuses for crop cover skin removal, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

In the process of poultry processing, a turkey can be hung by the hocks, a position that can be known as an inverted position, in that the neck of the bird may point toward the ground. While turkey and bird may be referred to interchangeably herein, a turkey is used as an example because a turkey is one example of a bird that has a well-developed crop. Other examples may include quail and pheasants. There are other species of birds that do not have a crop or in which the crop is essentially vestigial, such as an owl, or waterfowl, including geese, ducks, and swans. While the principles of certain embodiments of the present invention are explained with reference to removing the skin that covers the crop of a turkey, the same principles may be applied to removing the skin that covers the crop of a quail or pheasant, or skin in homologous areas of other poultry birds, such as ducks or geese.

Breast meat of birds is one of the highly valued portions. The crop of a bird is typically found lying against the breast muscles of the bird. While the breast muscles are considered a valuable food product, the crop is generally not high value meat. Likewise, lying in front of the crop cavity, the breast sponge of a wild turkey may be edible and nutritious, but as it is not breast meat, it may not be the primary target of the turkey processing. Thus, even if present in, for example, a heritage turkey, the sponge, crop, and skin covering the crop, may be removed to allow access to the valuable breast meat below.

At a high level, poultry processing may include slaughtering, cleaning and evisceration, and processing and preparation. Certain embodiments may be applicable to the cleaning and evisceration process.

In commercial processing centers turkeys may be hung by their hocks in an inverted position throughout the cleaning and evisceration process. The hocks may be hung from what is referred to as a shackle line. The shackle line may hold the hocks and convey the hanging bird through numerous stages. The stages can include removal of the feathers from the skin of the bird, removal of the heads, feet, and internal organs of the bird, and so on. The removal of parts of the birds, including the internal organs, can be referred to as the evisceration of the birds. Certain embodiments may particularly applicable to the evisceration process.

Figure 1:
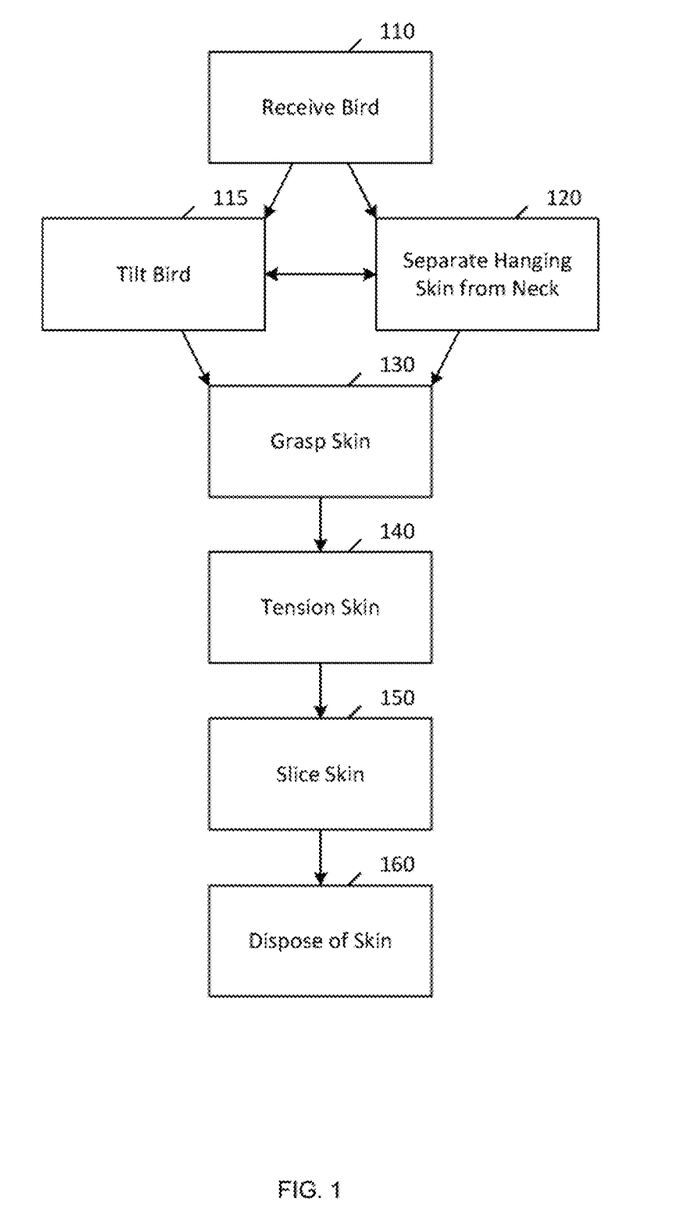
FIG. 1 illustrates a functional block diagram of a system according to certain embodiments of the present invention.

FIG. 1 illustrates a functional block diagram of a system according to certain embodiments of the present invention. As shown in FIG. 1, a processing station may, at 110, receive a bird conveyed by a shackle line. The shackle line may include conveyors. While the bird travels down the shackle line, a guide bar or other structure can, at 120, separate the loose hanging crop skin from the neck of the bird. Before or after the separation of the hanging skin from the neck at 120, the station can, at 115, tilt the bird. If tilting the bird at 115 occurs before separating the hanging skin from the neck, it may be easier for the guide bar to pass between the neck and the hanging skin that covered the crop. By the time that the bird arrives at the station, the crop itself may already have been removed but the skin that covered the crop may still be present. An auger can be used to hold the neck of the bird such that the bird tilts for the tilting at 115. The auger can also keep the turkey moving in the direction of the shackle line, thereby minimizing swaying.

At 130, the station can grasp the skin using a pair of rollers. The rollers can be peeler rollers. The rollers can grasp the skin at 130, but they can also tension the skin at 140. The rollers can have ribs, flutes, or the like, which may be provided in a spiral around the rollers in opposing directions to one another. In this way, the surface of the rollers may grasp and tension the skin of the bird while the bird continues to move in the direction of the shackle line. Other surface textures are also permitted. Peeler rollers may have a shaft length and shaft diameter exclusive of the surface texturing, and a bushing length and bushing diameter that includes the surface texture. Thus, for example, if the overall length of a roller is 1 meter, and 90 cm of the roller has the surface texturing, the shaft length (exclusive of the surface texturing) may be 10 cm, which may correspond to a portion of the roller. Similarly, if the diameter of the roller including the surface treatment is 2 cm, then the diameter of the shaft (exclusive of the surface texturing) may be 1 cm. These are simply numerical examples to demonstrate the principles, other lengths and diameters may be provided. The peeler rollers may also be characterized by the rate of spiraling of the surface treatment. For example, in a tightly wound spiral pattern, the pattern may advance one rotation every 1 cm of length. In a more loosely wound spiral pattern, the pattern may advance one rotation every 10 cm of length. The rollers may be made from stainless steel, tool steel, surgical steel, or the like.

Various techniques can be used to generate tension. For example, the rollers may be configured to provide uniform tension by being installed in parallel to the shackle line, or non-uniform tension (for example, gently increasing tension) by being angled slightly away from the shackle line. The degree of tension may be based on the rotation speed and the tightness of the spiral wound pattern of surface texture on the peeler rollers. The tension may also be enhanced by the tilting of the bird at 115, which may supply a component of force opposite the peeler rollers. Thus, the peeler rollers may provide a force that is opposed both by an auger holding the neck of the bird and by the shackles holding the hocks of the bird.

At 150, the station can slice the skin. The slice may be made while the skin is being tensioned at 140. By slicing while the skin is being tensioned at 140, the cut can safely remove more of the skin without risking damage to the valuable breast meat. Additionally, by slicing the skin while the bird is being tilted at 115, the bird may angled away from the slicing. Yet again, this may reduce the chances of nicking or otherwise damaging the valuable breast meat.

The slicing at 150 can be performed in a variety of different ways. For example, a rotating blade can be used. The rotating blade may be in the form of a disk with a serrated or sharpened edge. The rotating blade may be constructed similarly to the blade of a deli meat slicer. For example, the blade may be a disk with a serrated edge, which is able to withstand many revolutions per minute (rpm). For example, the blade may spin at a speed of 200 rpm to 2000 rpm. Other speeds are also permitted. The blade may be made from an integral disk that is mounted on a driving axel. Alternatively, the blade may be a ring that is mounted around an outer periphery of one or a pair of disks. When the blade is a separable ring, replacement cost of the blade may be slightly reduced. On the other hand, construction complexity of the blade may be slightly increased. A single blade may be used to slice the skin. The single blade may slice through the skin in an approximately horizontal direction. For example, if the shackle line is moving the bird from right to left, the blade may slice the skin starting at a left edge of the skin and proceeding to the right edge of the skin. The rotating blade may rotating contrary to the motion of the bird. Thus, for example, if the bird is moving from right to left, then the portion of the blade that contacts the skin may be moving from left to right.

Other slicing tools are also permitted. For example, instead of a disk blade, a single rotating knife blade or a fan-type arrangement of knife blades could be provided. In this approach, however, since only an outer tip of the blades may contact the skin, the only apparent benefit may be a slight reduction in the amount of metal used to construct the blade. Moreover, the fan-type approach may have lower stability as compared with a disk blade. As another option, a stationary blade can be provided, such that the skin is pressed against the static blade by the movement of the bird along the shackle line. This approach may have the benefit of reducing the need for a motor to power the blade. On the other hand, such a blade may need constant maintenance or replacement to maintain a sufficiently high level of sharpness.

In a further option, a reciprocating blade, similar in construction to a so-called electric knife, can be used. With a disk blade rotating at high speeds there is the potential for material from the bird to be ejected anywhere along the disk. By contrast, with a reciprocating blade, any material ejected by the blade may have a narrower field. Furthermore, the potentially dangerous sharp surface of a reciprocating blade may be much smaller than the potentially dangerous sharp surface of a disk blade.

Nevertheless, with a reciprocating blade, it may be more difficult to limit the travel of the distal of the end of the blade, to avoid jabbing the breast meat of the bird. While this jabbing may be softened by blunting the end of the blade, any such blunting may have the effect of requiring greater clearance between the usable cutting point of the blade and the breast meat. Thus, a rotating disk blade may reduce the chances that the breast meat will be jabbed. Furthermore, the potential mess caused by skin fragments or the like being ejected from the rotating blade may be controlled by placing one or more static shields, such as stainless steel baffles, around the majority of the circumference of the blade.

Other slicers are also permitted. For example, a high energy laser or plasma cutter could be used to slice the neck skin. However, such slicers may require a relatively high degree of computer vision or similar control mechanism in order to limit the cutting only to the desired skin without further cutting into the valuable breast meat. Similarly, these cutting tools may require a high energy input to operate. Furthermore, because of its water content and for other reasons, a bird's skin may be rather resistant to laser cutting, as distinct from, for example, paper.

The slicer may be positioned on the opposite side of the skin from the neck of the bird. This positioning may permit easier clearance. For example, if the blade were positioned between the bird's breast and the skin, it may be necessary to make the blade very small. This position may be described as inside, because it is between the meat of the bird and the skin of the bird. By contrast, a blade with a diameter on the same order of magnitude as the length of the bird may be used when the blade is positioned on the outside rather than the inside.

At 160, the station can dispose of the cut skin. For example, the cut skin can fall into a trough beneath the shackle line. The cut skin can be conveyed through the trough by a conveyer belt or by a flow of water through the trough. As another option, the cut skin can be manually removed from time to time.

Thus, certain embodiments of the present invention use a series of conveyors, rollers, at least one auger, and a blade to remove the skin that covers the crop of the turkey. While the bird travels down a shackle line, certain embodiments of an apparatus may use a guide bar to separate the loose hanging crop skin from the neck of the bird. The neck can be contained in a segmenting auger that can help to keep the bird moving through the machine, while simultaneously angling the bird so that a precise cut can be made. The guide bar can lead the crop skin to a pair of peeler rollers with fluting, which can pull the skin away from the bird, providing tension to the skin while simultaneously keeping pace with the shackle line. While the skin is being pulled downward, a rotating serrated blade can slice through the skin, removing the skin below the cut. The rotating serrate blade can be mounted on a gimbal that allows the blade to be adjusted in a multiple-axis manner. Once the skin is cut, the cut off portion can drop into a chute or trough for further processing and/or disposal.

The gimbal and the operation of the gimbal are not illustrated in FIG. 1. The gimbal or similar device can be used to precisely position the station and elements of the station. For example, the shackle line may be provided in a facility that processes poultry, and the bird position, therefore, may be determined by the processing facility. Accordingly, the station may include one or multiple movable elements that can adjust the height of the station to align to the hanging position of the birds. The adjustment may be performed while the station is off-line. For example, when processing is not being performed on birds, the gimbal can be used to precisely position the blade as well as the other components of the station. For example, the gimbal can be used to adjust the station to be level even if the floor on which the station is placed is not level.

Figure 2:
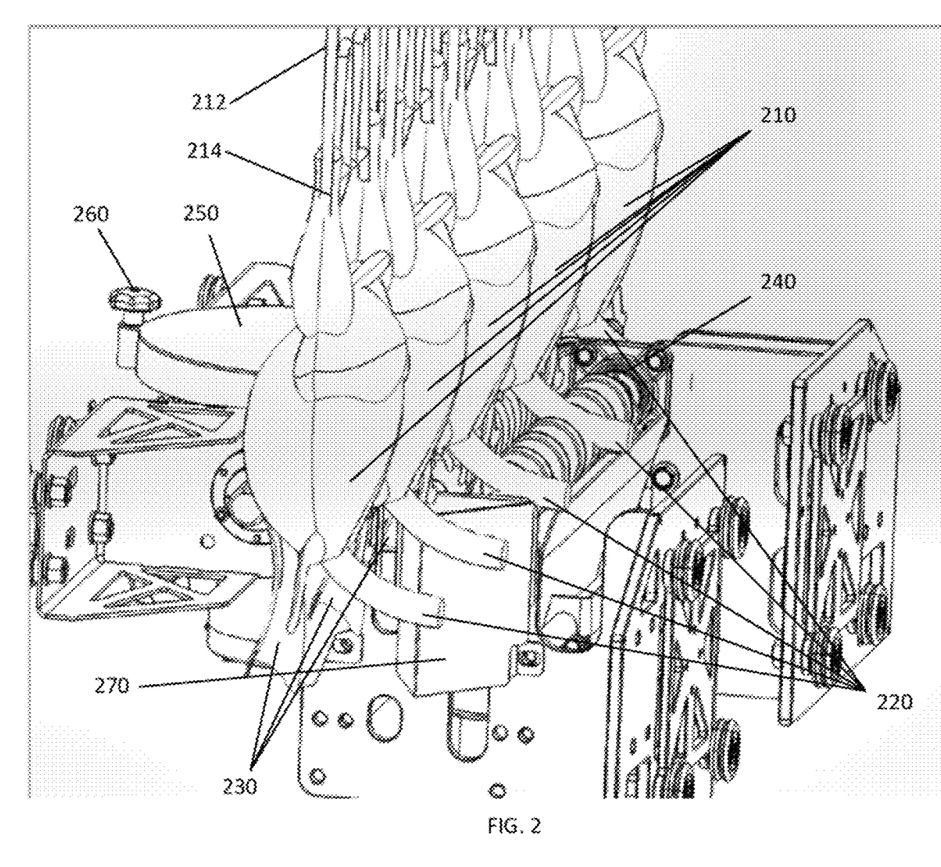
FIG. 2 illustrates a perspective view from an entry side of a station according to certain embodiments.

FIG. 2 illustrates a perspective view from an entry side of a station according to certain embodiments of the present invention. As shown in FIG. 2, birds 210 can be hung from a shackle line 212 by their hocks 214. The necks 220 of the birds may be toward the right and the crop cover skin 230 can be toward the left. The necks 220 can be supported, moved along, and tilted using auger 240. Auger 240 can rotate on its own axis supported by the station at each end. The rotation of auger 240 can allow the neck 220 of the bird 210 to move at the same speed as the shackle line 212, while maintaining a tilt away from blade housing 250, which is shown to the left of the birds 210, but is not fully visible from this angle. A blade cover release knob 260 can be used for precisely removing or securing a cover portion blade assembly 250. Guide bar 270 can guide the neck 220 to one side and the crop cover skin 230 to the other side.

Figure 3:
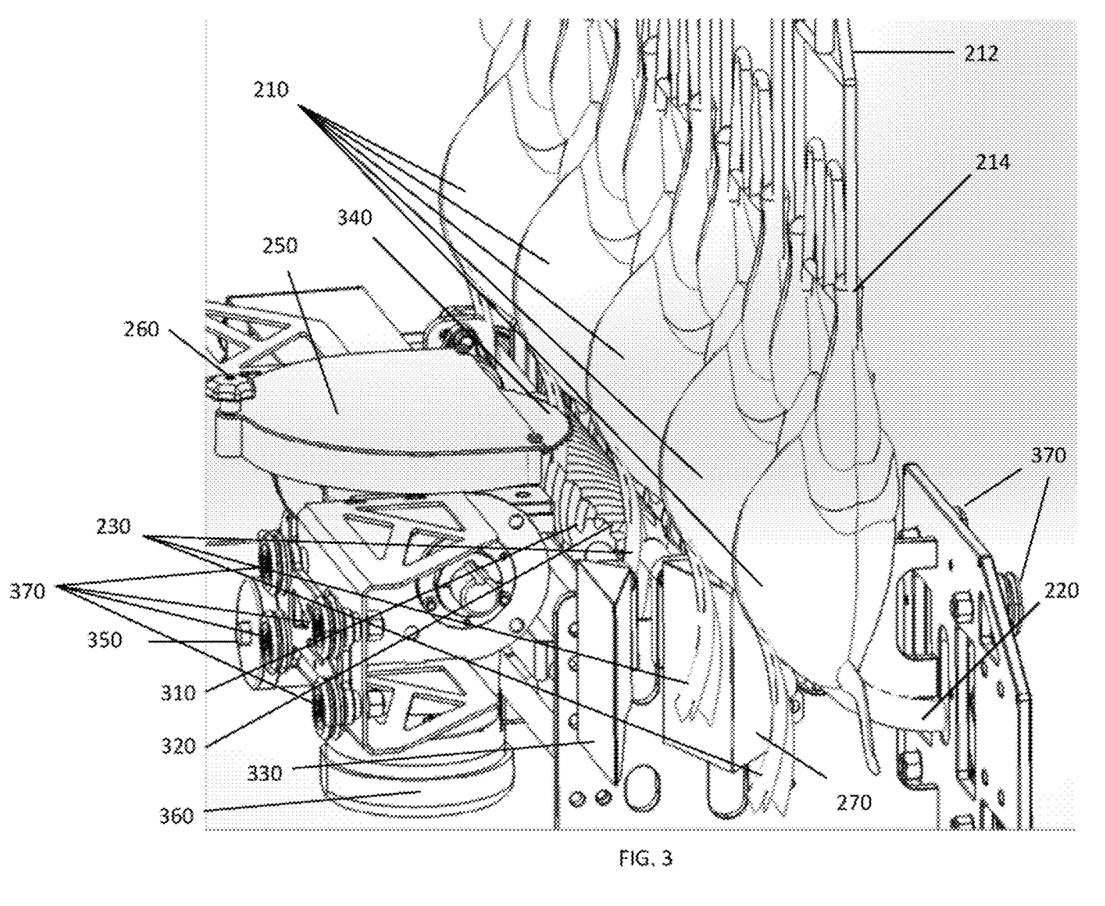
FIG. 3 illustrates another perspective view from an entry side of a station according to certain embodiments of the present invention.

FIG. 3 illustrates another perspective view from an entry side of a station according to certain embodiments of the present invention. As shown in FIG. 3, birds 210 can be hung by their hocks 214 from shackles 212. As shown in FIG. 3, guide bar 270 can lead crop cover skin 230 of a given bird 210 to one side and the neck 220 of the bird 210 to the other side.

As can be seen from FIG. 3, the crop cover skin can be fed to a pair of peeler rollers 310, 320, including a blade side roller 310 and the opposite roller 320, which can be described as being on the neck side as contrasted to the blade. The pair of peeler rollers 310, 320 can receive the crop cover skin 230 through a channel formed by the guide bar 270 and a further guide bar 330, which can funnel the crop cover skin 230 to align with the front of the pair of peeler rollers 310, 320. The pair of peeler rollers 310, 320 can grasp, tension, and convey the crop cover skin 230. As visible in FIG. 3, blade 340 can extend from blade housing 250. The pair of peeler rollers 310, 320 can bring the crop cover skin 230 into contact with the blade 340, while the blade 340 is rotating at high speed. The blade 340 can be powered by a motor 350, which may be an electric motor.

The station can include a pedestal 360, which can be configured to stabilize a portion of the station that includes the motor 350 and blade 340. There can also be a plurality of mounts 370 that can be used to connect to other infrastructure, such as existing line hardware. The line hardware may be a steel frame structure, poured concrete walls, or the like.

Figure 4:
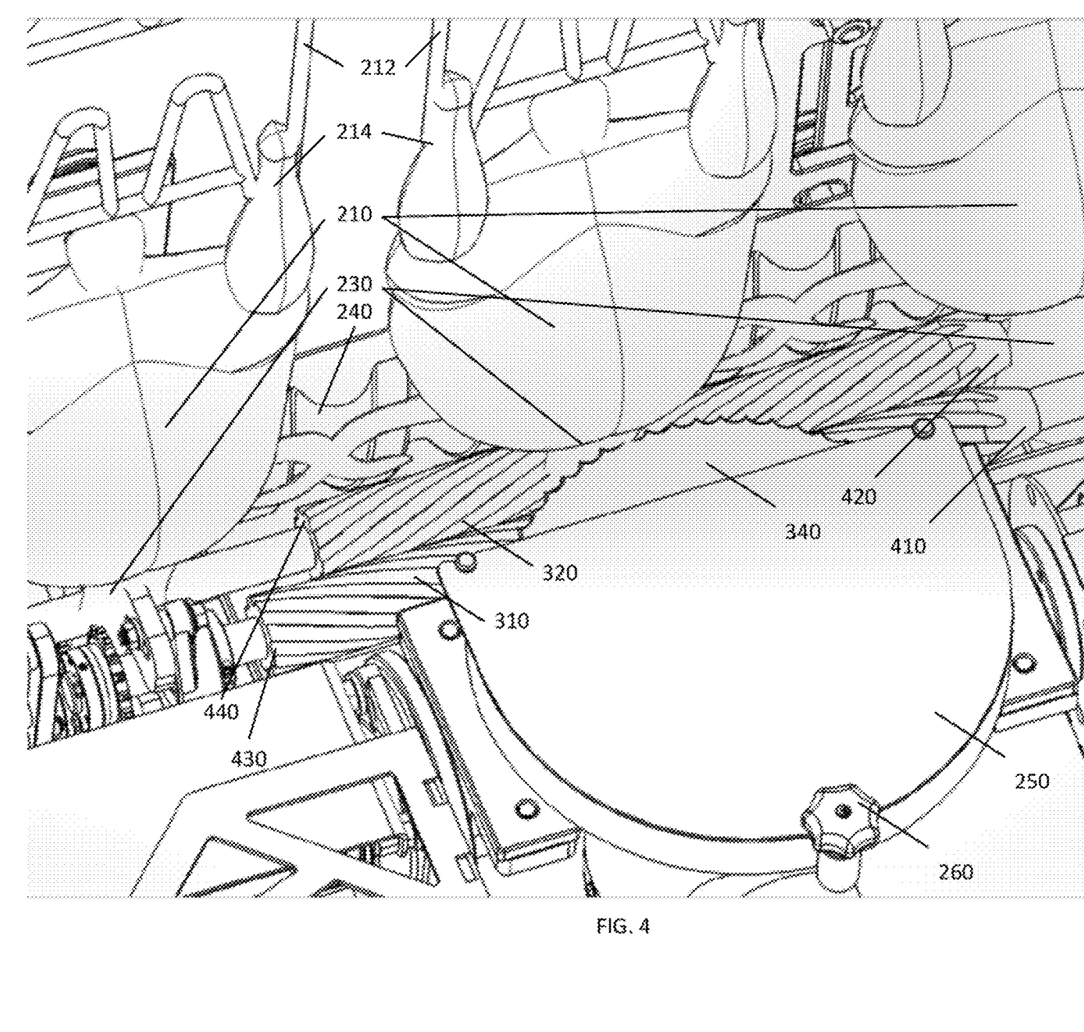
FIG. 4 illustrates a perspective view from above a station according to certain embodiments of the present invention.

FIG. 4 illustrates a perspective view from above a station according to certain embodiments of the present invention. The entry side of the station in this view may be at the right and the exit side of the station may be at the left. Birds 210 can be hanging from a shackle line 212 by their hocks 214, as mentioned above. The crop cover skin 230 may be funneled between the pair of peeler rollers 310, 320. Each roller of the pair may have respective tapered front end 410, 420. The tapered front ends 410, 420 may assist in guiding the crop cover skin 230. The back ends 430, 440 can be offset from one another this offset can permit a cut-off portion of the crop cover skin 230 to be cleared efficiently from the peeler roller pair 310, 320.

The blade cover release knob 260 can be used to access and clean blade 340 or to remove blade 340 from blade housing 250 by removing a cover portion of blade housing 250. As can be seen from FIG. 4, the blade 340 may be arranged to come as close as possible to bird 210 without touching any part of bird 210 aside from crop cover skin 230.

Figure 5:
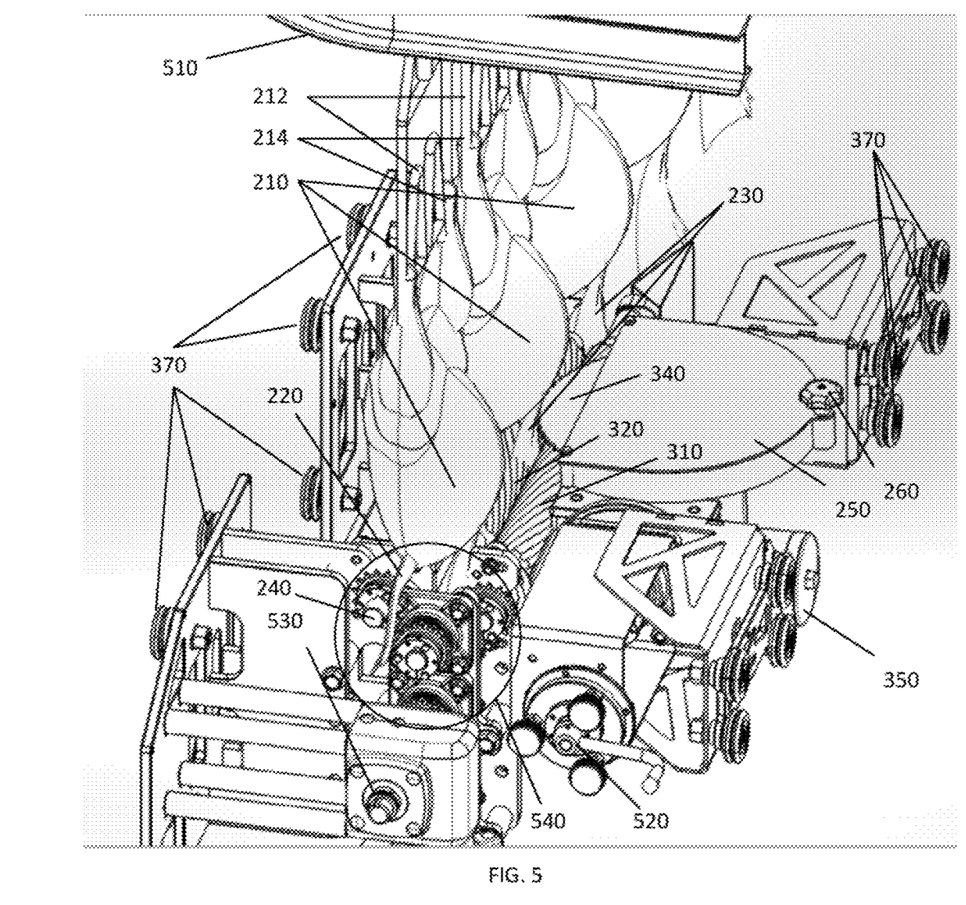
FIG. 5 illustrates a perspective view from an exit side of a station according to certain embodiments of the present invention.

FIG. 5 illustrates a perspective view from an exit side of a station according to certain embodiments of the present invention. As shown in FIG. 5, the shackle line 212 holding the hocks 214 of the birds 210 can be suspended from an overhead support 510, which may serve as a conveyer for the shackle line 212.

A gimbal 520 may be used to position blade 340 and/or blade housing 250 precisely with respect to birds 210 and particularly with respect to crop cover skin 230. Conveyer motor 530 can drive the auger 240 and pair of peeler rollers 310, 320, using gearing 540. Gearing 540 can be arranged to provide appropriate synchronization of movement of the auger 240 (only the shaft of auger 240 is visible from the perspective shown in FIG. 5) and pair of peeler rollers 310, 320. Furthermore, the gearing 540 can also be set up so that the necks 220 of birds 210 match the speed of the shackle line 212.

Figure 6:
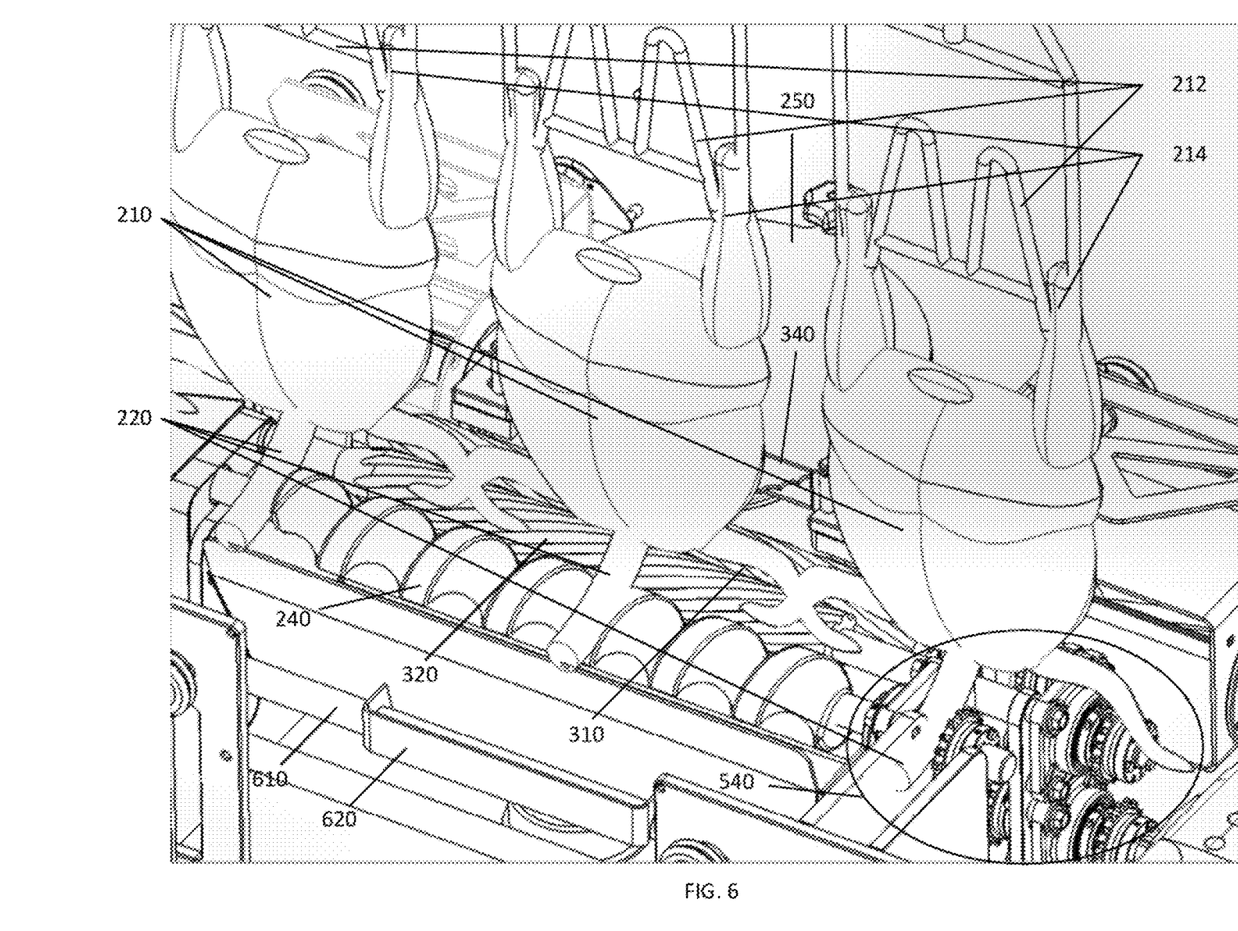
FIG. 6 illustrates a perspective view from a neck side of a station according to certain embodiments of the present invention.

FIG. 6 illustrates a perspective view from a neck side of a station according to certain embodiments of the present invention. In the illustration of FIG. 6, the birds 210 can enter from the left and exit to the right. The necks 220 of the birds 210 can be guided and supported by auger 240 away from pair of peeler rollers 310, 320. Gearing 540 is shown exposed, but can be covered if desired. Drawer 610 can be provided extending beneath pair of peeler rollers 310, 320. A handle 620 can be used permit removal and insertion of drawer 610.

The illustrated embodiments are not exhaustive of the features that may be included. For example, there may be additional mechanisms for positioning the turkey neck on the far side of the auger from the peeler rollers, thereby changing the angle of the bird, relative to the blade. The position of the turkey neck can thus be different from what is shown in the drawings.

Although the drawings show mechanisms that may be used to position and reposition the device, it is not necessary that all of these mechanisms be provided in every embodiment. The cranks may be replaced with other mechanical elements that perform a similar function. The spacing and sizing of the components of the station can be varied. For example, the spacing and sizing can be modified to accommodate the wings of the birds, as such wings may move erratically and potentially occupy a variety of positions in a wide area around the bird. Contact between the wings and the station may be avoided with suitable arrangement of the station.

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:
   a first conveyor configured to convey a neck of a bird in a first direction;
   a second conveyer configured to convey crop cover skin of the bird in the first direction; and
   a cutter configured to cut the crop cover skin from the bird while the bird is conveyed in the first direction.

2. The apparatus of claim 1, wherein the first conveyor is synchronized to the second conveyor.

3. The apparatus of claim 1, wherein the first conveyor is configured to tilt a breast of the bird away from the cutter.

4. The apparatus of claim 1, wherein the first conveyor comprises an auger.

5. The apparatus of claim 1, wherein the second conveyor comprises a pair of peeler rollers.

6. The apparatus of claim 5, wherein each roller of the pair of rollers comprises a tapered front end.

7. The apparatus of claim 5, wherein each roller of the pair of rollers comprises a fluted surface.

8. The apparatus of claim 5, wherein a first end of the pair of peeler rollers is aligned in a plane orthogonal to a rotation axis of the pair of peeler rollers and a second end of each roller of the pair of peeler rollers is offset from one another.

9. The apparatus of claim 1, wherein the second conveyer is configured to tension the crop cover skin while the cutter cuts the crop cover skin.

10. The apparatus of claim 9, wherein the second conveyer is configured to tension the crop cover skin by pulling the crop cover skin away from the bird using a pair of peeler rollers.

11. The apparatus of claim 1, wherein the cutter comprises a rotating blade.

12. The apparatus of claim 11, wherein the rotating blade comprises a disk with a serrated edge.

13. The apparatus of claim 11, wherein the rotating blade is configured to move in a second direction opposite to the crop cover skin.

14. The apparatus of claim 11, further comprising:
   a blade motor configured to drive the rotating blade.

15. The apparatus of claim 1, further comprising:
   gearing configured to synchronize movement of the first conveyor and the second conveyor.

16. The apparatus of claim 15, further comprising:
   a synchronization motor configured to drive the first conveyer and the second conveyer in synchronization with a shackle line.

17. A method, comprising:
   receiving a bird in a station;
   grasping crop cover skin of the bird by a pair of peeler rollers;
   tensioning the crop cover skin by the pair of peeler rollers; and
   slicing the crop cover skin while the crop cover skin is being tensioned.

18. The method of claim 17, further comprising:
   tilting a breast of the bird away from the crop cover skin while the crop cover skin is being tensioned and sliced.

19. The method of claim 17, further comprising:
   separating the crop cover skin from a neck of the bird.

20. An apparatus, comprising:
   means for conveying a neck of a bird in a first direction;
   means for conveying crop cover skin of the bird in the first direction; and means for cutting the crop cover skin from the bird while the bird is conveyed in the first direction.

\* \* \* \* \*